(12) United States Patent
Kikuchi

(10) Patent No.: US 6,411,436 B1
(45) Date of Patent: Jun. 25, 2002

(54) TRANSMISSION TYPE PROJECTION SCREEN

(75) Inventor: Toji Kikuchi, Tokyo (JP)

(73) Assignee: Kikuchi Science Laboratory Inc., Tokyo (JP)

( * ) Notice: Subject to any disclaimer, the term of this patent is extended or adjusted under 35 U.S.C. 154(b) by 0 days.

(21) Appl. No.: 09/627,118

(22) Filed: Jul. 27, 2000

(30) Foreign Application Priority Data

Jul. 27, 1999 (JP) .......................................... 11-211969
Feb. 7, 2000 (JP) ....................................... 2000-028798

(51) Int. Cl.$^7$ .......................... G03B 21/56; G03B 21/60
(52) U.S. Cl. ........................ 359/460; 359/443; 359/453
(58) Field of Search ................................ 359/460, 461, 359/443, 450, 452, 453

(56) References Cited

U.S. PATENT DOCUMENTS

| | | | | |
|---|---|---|---|---|
| 4,083,626 A | * | 4/1978 | Miyahara et al. | 359/453 |
| 5,307,205 A | * | 4/1994 | Ludwig, Jr. et al. | 359/453 |
| 5,337,179 A | * | 8/1994 | Hodges | 359/443 |
| 5,361,163 A | * | 11/1994 | Matsuda et al. | 359/452 |
| 6,118,573 A | * | 9/2000 | Kubo et al. | 359/266 |

* cited by examiner

Primary Examiner—Russell Adams
Assistant Examiner—Magda Cruz
(74) Attorney, Agent, or Firm—McCormick, Paulding & Huber LLP

(57) ABSTRACT

A transmission type projection screen includes a diffusion layer on which projection light is focused, and a neutral gray layer positioned behind the diffusion layer on a rear side of the diffusion layer at which the projection light enters. The optical density of the neutral gray layer is in the range of 0.05 to 0.7.

24 Claims, 5 Drawing Sheets

Prior Art

TRANSMISSION TYPE PROJECTION SCREEN

BACKGROUND OF THE INVENTION

1. Field of the Invention

The present invention relates to a transmission type projection screen which can be used with a projector.

2. Description of the Related Art

In a transmission type projection screen (also called a "rear type screen"), a picture projected from a projector from behind the screen is focused on the rear surface thereof (i.e., the surface opposite to the front surface facing the audience), so that the picture can be seen through the screen from the front side (audience side) thereof.

FIG. 5 shows an explanatory view of such a conventional transmission type projection screen, showing the laminated structure thereof. This conventional screen is a laminate screen which is composed of a transparent layer 1 as a base layer of the screen and an optical diffusion layer (hereinafter simply called "diffusion layer") 2 which is laminated to the transparent layer 1 on one side thereof.

The transparent layer 1 is a base layer of the screen and can be made of, for example, a hard (non-deformable) transparent plastic plate which ensures a required strength of the whole screen while maintaining the shape thereof. Alternatively, the transparent layer 1 can be made of a soft transparent plastic sheet which is bendable and/or able to be rolled up into a tube.

The diffusion layer 2 is a translucent layer (a milk-white layer) whose base material (binder) is, e.g., a translucent synthetic resin (a milk-white layer) such as acrylic resin or vinyl chloride. A light diffusing material such as mica powder, silicon compound powder, a magnesium oxide or a titanium oxide is mixed into the base material to form the translucent diffusion layer 2.

The diffusion layer 2 faces the front (the audience side) while the transparent layer 1 faces the rear (the projector side). Projection light L emitted by a projector (not shown) towards the screen from behind passes through the transparent layer 1 to reach the diffusion layer 2 so that the projection light L is focused on the diffusion layer 2. Consequently, the picture formed by the projection light can be seen through the screen from the front thereof.

In a conventional transmission type projection screen as shown in FIG. 5, among the diffused light (radially diffused light rays surrounded by a dotted circle line shown in FIG. 5) of the light L in the diffusion layer 2, the light which is diffused by the diffusion layer 2 rearwardly to be totally reflected by the rear surface (the right surface as viewed in FIG. 5 on the projector side) of the transparent layer 1 to thus proceed back to the diffusion layer 2, i.e., reflected light La shown in FIG. 5 is a problem.

Regarding the light which is diffused by the diffusion layer 2 to be reflected by the rear surface (the right surface as viewed in FIG. 5 on the projector side) of the transparent layer 1, the diffused light is totally reflected by the rear surface of the transparent layer 1 if the angle of incidence of the diffused light (the angle "α" shown in FIG. 5) on the rear surface of the transparent layer 1 is equal to or greater than 42 degrees on condition that the refractive index of the transparent layer 1 is 1.494. If the gain of the screen is approximately 1.0 while the absorbance of the screen is small, the amount of light which is diffused by the diffusion layer 2 to proceed rearwardly towards the transparent layer 1 is large, and therefore the amount of the reflected light La becomes large. Consequently, this reflected light La is incident on the diffusion layer 2. The image of the reflected light La which is formed on the diffusion layer 2 is a blurry image (out-of-focus image) and has an adverse influence on a proper image focused on the diffusion layer 2 in the form of noise (halation). This decreases the contrast and resolution of the proper image focused on the diffusion layer 2.

SUMMARY OF THE INVENTION

An object of the present invention is to provide a transmission type projection screen which makes it possible to prevent the contrast and resolution of the proper image focused on the diffusion layer from deteriorating due to the aforementioned reflected light La.

To achieve the object mentioned above, according to an aspect of the present invention, a transmission type projection screen is provided, including a diffusion layer on which projection light is focused, and a neutral gray layer positioned behind the diffusion layer on a rear side of the diffusion layer at which the projection light enters. The optical density of the neutral gray layer is in the range of 0.05 to 0.7.

Preferably, the neutral gray layer includes at least a coloring matter and/or a carbon black pigment, and the diffusion layer includes a neutral gray coloring matter. The projection screen can be either non-deformable, bendable, or able to be rolled up.

According to another aspect of the present invention, a transmission type projection screen is provided, including a diffusion layer, a transparent layer, and a neutral gray layer. The optical density of the neutral gray layer is in the range of 0.05 to 0.7.

In an embodiment, the diffusion layer, the transparent layer and the neutral gray layer are arranged in this order from an audience side to a projector side.

In another embodiment, the diffusion layer, the neutral gray layer and the transparent layer are arranged in this order from an audience side to a projector side.

Preferably, the neutral gray layer includes at least a coloring matter and/or a carbon black pigment, and the diffusion layer includes a neutral gray coloring matter. The projection screen can be either non-deformable, bendable, or able to be rolled up.

The transparent member can made from either a non-deformable transparent plastic plate, a bendable transparent plastic sheet, or a transparent plastic sheet which is able to be rolled up.

According to another aspect of the present invention, a transmission type projection screen is provided, including a diffusion layer, a first neutral gray layer, a transparent layer, and a second neutral gray layer. The diffusion layer, the first neutral gray layer, the transparent layer and the second neutral gray layer are arranged in this order from an audience side to a projector side; and the total optical density of the first neutral gray layer and the second neutral gray layer is in the range of 0.05 to 0.7.

Preferably, the neutral gray layer includes at least a coloring matter and/or a carbon black pigment, and the diffusion layer includes a neutral gray coloring matter. The projection screen can be either non-deformable, bendable, or able to be rolled up.

The transparent member can made from either a non-deformable transparent plastic plate, a bendable transparent plastic sheet, or a transparent plastic sheet which is able to be rolled up.

According to another aspect of the present invention, a transmission type projection screen is provided, including a diffusion layer, and a neutral gray layer positioned behind the diffusion layer on a rear side of the diffusion layer at which the projection light enters. The diffusion layer is made of a bendable plastic sheet, and the optical density of the neutral gray layer is in the range of 0.05 to 0.7.

Preferably, the neutral gray layer includes at least a coloring matter and/or a carbon black pigment.

According to the transmission type projection screen to which the present invention is applied, since the screen is provided behind the diffusion layer with a neutral gray layer whose optical density is in the range of 0.05 to 0.7, the quantity of the light (reflected light) which is diffused by the diffusion layer to be subsequently reflected by the rear surface of the transparent layer to thus proceed back to the diffusion layer can be largely reduced, which makes it possible to prevent the contrast and resolution of the proper image focused on the diffusion layer from deteriorating due to the reflected light.

The present disclosure relates to subject matter contained in Japanese Patent Applications Nos. 11-211969 (filed on Jul. 27, 1999) and 2000-28798 (filed on Feb. 7, 2000) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
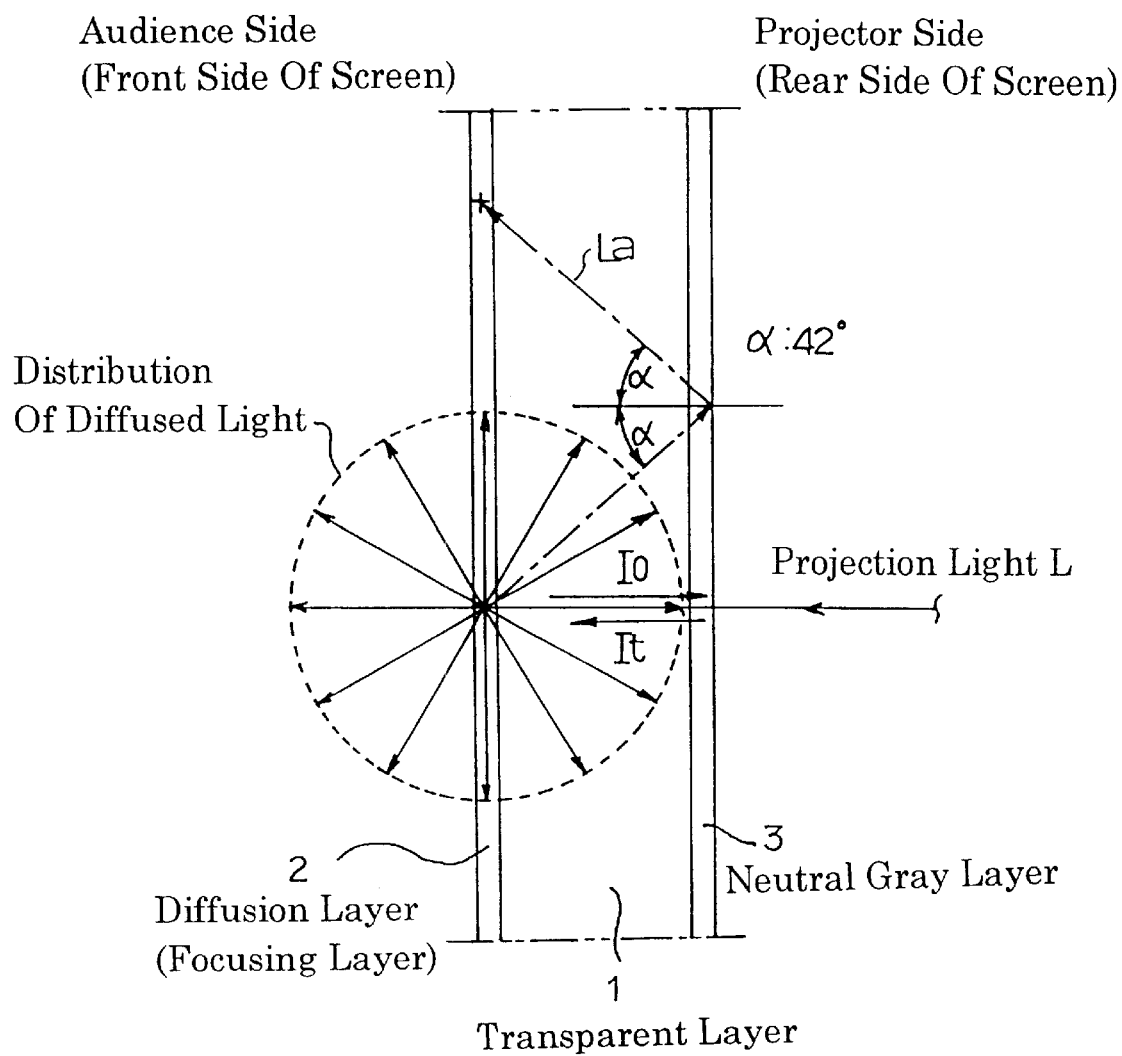
FIG. 1 is an explanatory view of the first embodiment of a transmission type projection screen, showing the laminated structure thereof.

FIG. 1 is an explanatory view of the first embodiment of a transmission type projection screen, showing the laminated structure thereof. This screen has three layers, i.e., a diffusion layer 2, a transparent layer 1 as a base layer of the screen, and a neutral gray layer 3, which are arranged in this order from the audience side (the left side as viewed in FIG. 1) to the projector side (the right side as viewed in FIG. 1).

The transparent layer 1 is a base layer of the screen which is made of, e.g., a hard (non-deformable) transparent plastic plate, or a glass plate, which ensures a required strength of the whole screen while maintaining the shape thereof. Alternatively, the transparent layer 1 can be made of a soft transparent plastic sheet which is bendable and/or able to be rolled up into a tube. The projection screen is either a hard screen or a soft screen depending on whether the transparent layer is hard (non-deformable) or soft (bendable and/or can be rolled up). The thickness of the transparent layer 1 is generally determined within the range of 2 to 15 mm. In this particular embodiment, the transparent layer 1 is made of a hard (non-deformable) acrylic resin material while the thickness of the transparent layer 1 is 9 mm.

The diffusion layer 2 is a translucent layer whose base material is, e.g., glass or a transparent synthetic resin such as acrylic resin or vinyl chloride. A light diffusing material such as mica powder or silicon compound powder is mixed into the base material to form the translucent diffusion layer 2. The diffusion layer 2 is laminated to or coated on the transparent layer 1 on one side (the front side) thereof. The thickness of the diffusion layer 2 is generally determined in the range of 0.05 to 1.0 mm. In this particular embodiment, the thickness of the diffusion layer 2 is 0.4 mm.

The neutral gray layer (an anti-reflection layer or an anti-halation layer) 3 is made of, e.g., glass or a transparent synthetic resin such as acrylic resin or vinyl chloride as a base material and a neutral gray coloring matter which is mixed into the base material. The optical density of the neutral gray layer 3 can be adjusted by varying the amount of the coloring matter of neutral gray that is mixed into the base material or by changing the thickness of the neutral gray layer 3. The neutral gray layer 3 is laminated to or coated on the other side (the rear side) of the transparent layer 1. The thickness of the neutral gray layer 3 is generally determined in the range of 0.05 to 0.5 mm. In this particular embodiment, the thickness of the neutral gray layer 3 is 0.3 mm.

The projection light L, which is projected towards the screen from behind, passes through firstly the neutral gray layer 3 and subsequently the transparent layer 1 to finally reach the diffused layer 2 so that the projection light L is focused on the diffusion layer 2. Consequently, the picture formed by the projection light L can be seen through the screen from the front thereof.

In this case, among the diffused light (radially diffused light rays surrounded by a dotted circle line shown in FIG. 1) of the light L in the diffusion layer 2, the light which is diffused by the diffusion layer 2 rearwardly enters the neutral gray layer 3. Part of this light which enters the neutral gray layer 3 is partly or totally reflected by the rear surface (the right surface as viewed in FIG. 1 on the projector side) of the neutral gray layer 3 to thereby return to the diffused layer 2 as reflected light La shown in FIG. 1.

If it is assumed that the optical density (the degree of opacity of a translucent medium expressed by log $(I_0/I_t)$ wherein "$I_0$" represents the intensity of the incident light, and "$I_t$" represents the intensity of the transmitted light) of the neutral gray layer 3 is 0.3, the following equation is satisfied:

$$0.3 = \log(I_0/I_t)$$

Therefore, the following equations are obtained:

$$"I_0/I_t" = 1.995,$$

and therefore $$"I_t" = "I_0" \times 10^{-0.3}.$$

If the screen is provided on the rear side (the projector side) thereof with the neutral gray layer 3 whose optical density is 0.3, the reflected light La has passed through the neutral gray layer 3 twice as shown in FIG. 1, so that the intensity thereof is reduced by 25.12 percent since the following equation is satisfied:

$$(10^{-0.3})^2 = 10^{-0.6} = 25.12\%.$$

Figure 5:
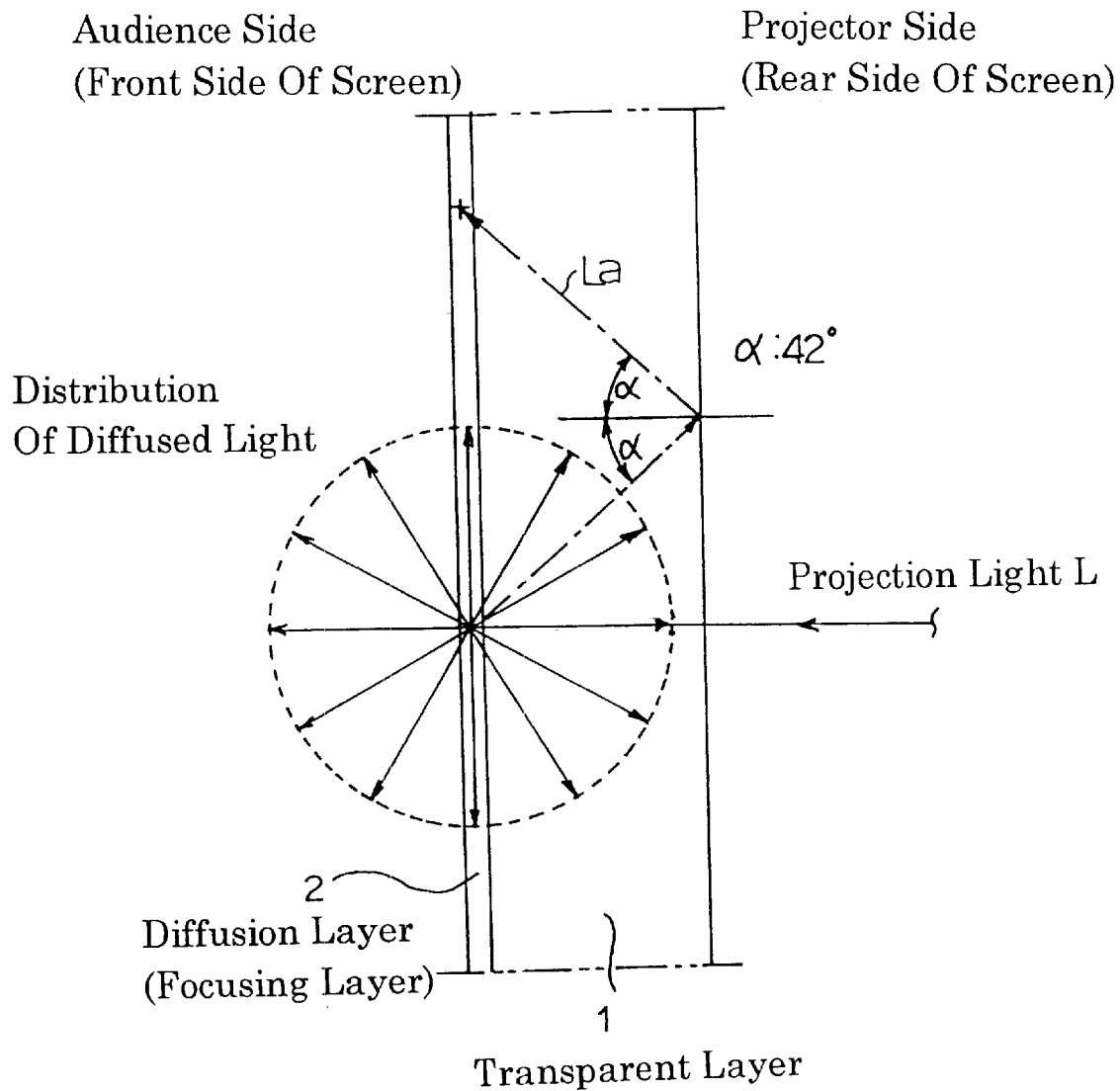
FIG. 5 is an explanatory view of a conventional transmission type projection screen, showing the laminated structure thereof.

If the refractive index of the neutral gray layer 3 is 1.495, the rear surface of the neutral gray layer 3 totally reflects the incident light thereon on condition that the incident angle of the incident light is 42 degrees. In this case, the optical path in the neutral gray layer 3 becomes 1.49 times longer. Consequently, only the reflected light La whose intensity has reduced by 12.6 percent through the neutral gray layer 3 returns to the focal plane, i.e., the diffusion layer 2, as compared with the conventional case shown in FIG. 5 in which the screen is provided with no layer corresponding to the neutral gray layer 3.

As a result, the reflection La whose intensity is thus reduced cannot incur substantial noise (halation) on a proper image focused on the diffusion layer 2, so that the deterioration of the contrast and resolution of the proper image focused on the diffusion layer 2 due to the reflected light La can be prevented from occurring.

Preferably, the optical density of the neutral gray layer 3 is determined in the range of 0.05 to 0.7. More preferably, in the range of 0.1 to 0.3. These particular ranges are determined by experiments. If the optical density of the neutral gray layer 3 is smaller than 0.05, the harmful diffused light cannot be sufficiently absorbed by the neutral gray layer 3. If the optical density of the neutral gray layer 3 is greater than 0.7, the quantity of the projection light L is unnecessarily reduced, and therefore the projection light L does not need to be absorbed any further by neutral gray layer 3.

Figure 2:
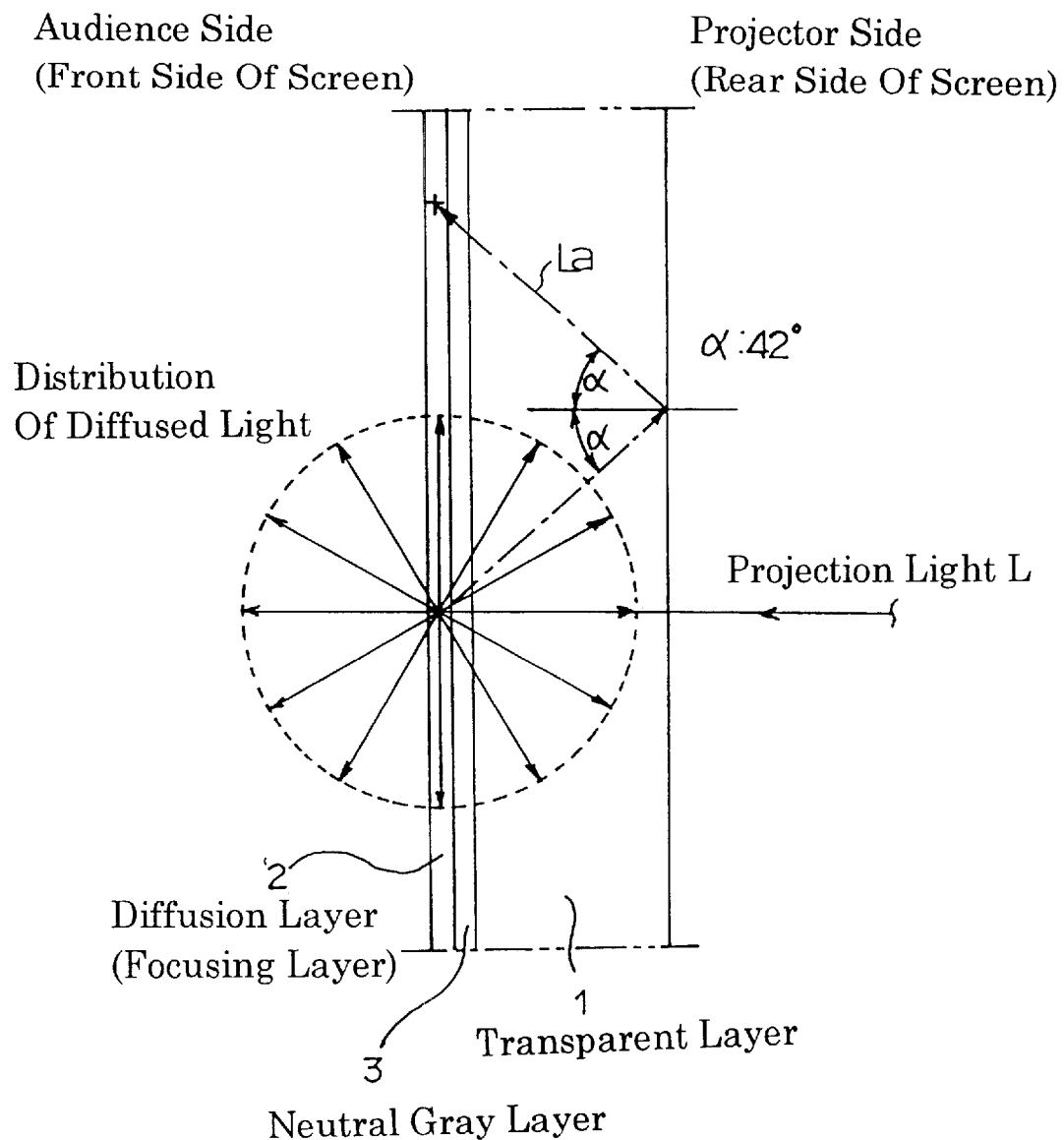
FIG. 2 is an explanatory view of the second embodiment of the transmission type projection screen, showing the laminated structure thereof.

FIG. 2 is an explanatory view of the second embodiment of the transmission type projection screen, showing the laminated structure thereof. This screen has three layers, i.e., a diffusion layer 2, a neutral gray layer 3 and a transparent layer 1 as a base layer of the screen, which are arranged in this order from the audience side (the left side as viewed in FIG. 2) to the projector side (the right side as viewed in FIG. 2).

The effect of the neutral gray layer 3 in the second embodiment of the screen (in which the neutral gray layer 3 is positioned between the diffusion layer 2 and the transparent layer 1) is the same as in the first embodiment of the screen shown in FIG. 1 (in which the neutral gray layer 3 is positioned on the opposite side of the transparent layer 1 from the diffusion layer 2).

Figure 3:
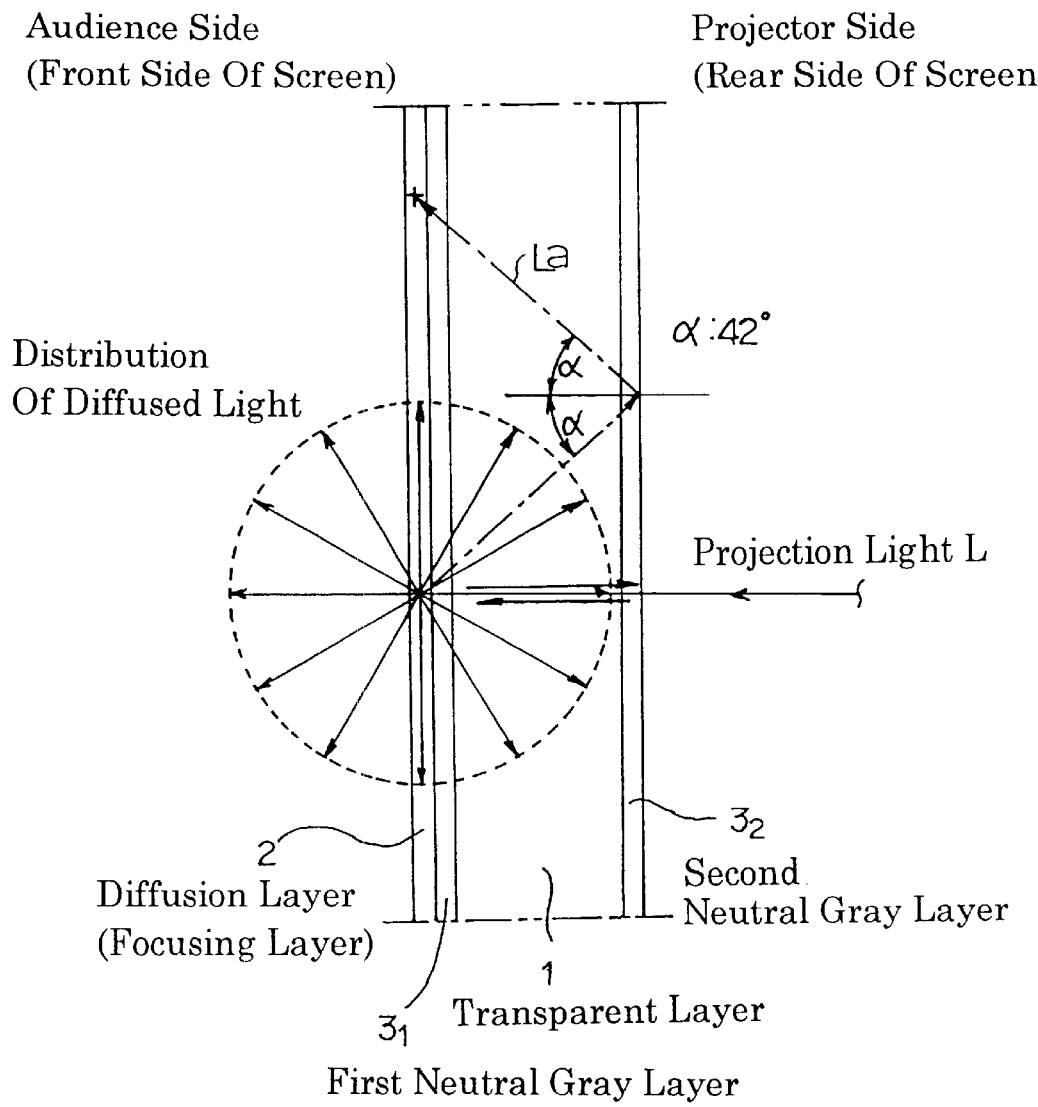
FIG. 3 is an explanatory view of the third embodiment of the transmission type projection screen, showing the laminated structure thereof.

FIG. 3 is an explanatory view of the third embodiment of the transmission type projection screen, showing the laminated structure thereof. This screen has four layers, i.e., a diffusion layer 2, a first neutral gray layer $3_1$, a transparent layer 1 as a base layer of the screen and a second neutral gray layer $3_2$, which are arranged in this order from the audience side (the left side as viewed in FIG. 3) to the projector side (the right side as viewed in FIG. 3). In this third embodiment, the total optical density of the first and second neutral gray layers $3_1$ and $3_2$ is determined in the range of 0.05 to 0.7.

Even if the first neutral gray layer $3_1$ is positioned between the diffusion layer 2 and the transparent layer 1 while the second neutral gray layer $3_2$ is positioned on the opposite side of the transparent layer 1 from the first neutral gray layer $3_1$, i.e., the first and second neutral gray layers $3_1$ and $3_2$ are respectively provided on the front and rear surfaces of the transparent layer 1 as shown in FIG. 3, an effect similar to that in the first or second embodiment can be expected as long as the total optical density of the first and second neutral gray layers $3^1$ and $3_2$ is in the range of 0.05 to 0.7. Accordingly, the neutral gray layer can be divided into two in such a manner as shown in the third embodiment of in FIG. 3.

The transparent layer 1, provided as a base layer of the screen, can be omitted if the screen can maintain the strength and the proper shape thereof without the transparent layer 1.

Figure 4:
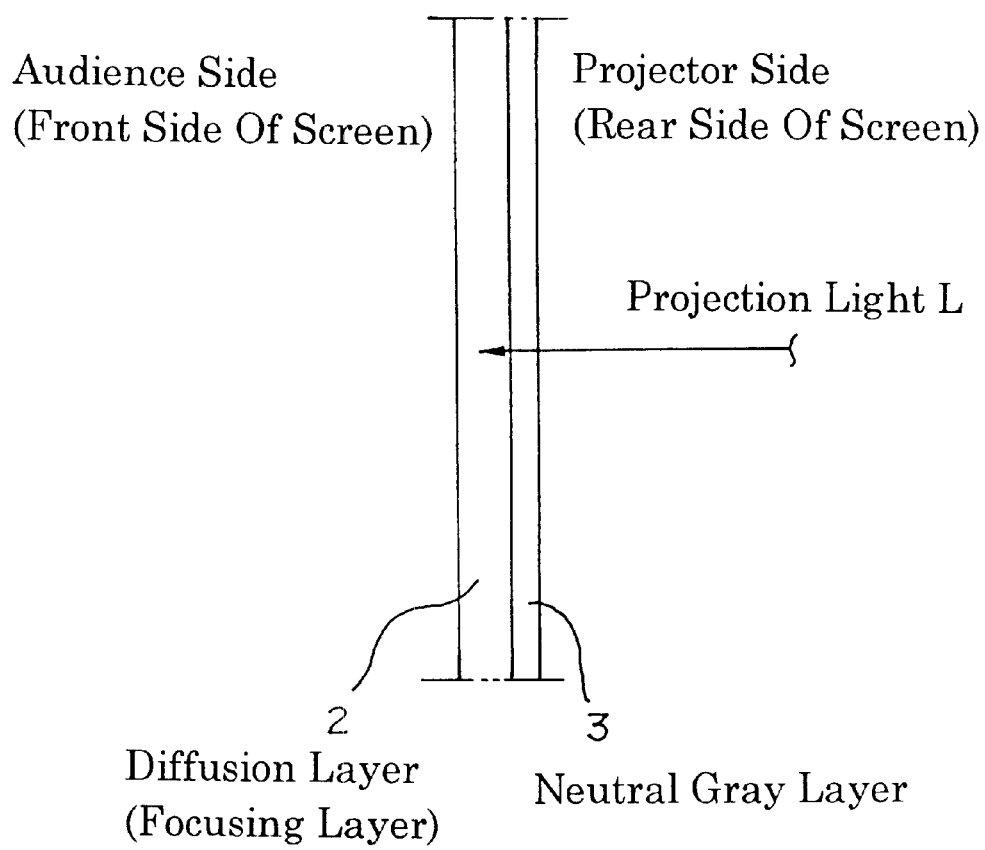
FIG. 4 is an explanatory view of the fourth embodiment of a transmission type projection screen, showing the laminated structure thereof.

FIG. 4 is an explanatory view of the fourth embodiment of the transmission type projection screen, showing the laminated structure thereof, which is provided with no layer corresponding to the transparent layer 1 of each of the previous embodiments. This screen has two layers: a diffusion layer 2 and a neutral gray layer 3. The diffusion layer 2 is made of a soft (bendable) or hard (non-deformable) plastic sheet. The neutral gray layer 3 is laminated to the rear surface (the right surface as viewed in FIG. 4 on the projector side) of the diffusion layer 2. The optical density of the neutral gray layer 3 is determined in the range of 0.05 to 0.7.

If a neutral gray coloring matter is mixed into the diffusion layer 2, the deterioration of the contrast and resolution of the proper image focused on the diffusion layer 2 due to the reflected light La can be slightly prevented from occurring. However, an effect of reducing the intensity of the reflected light La in this case is obviously inferior to that in each of the first through fourth embodiments of the present invention. In the present invention, it does not matter if the coloring matter of neutral gray is mixed into the diffusion layer 2 or not. A desired object can be attained by providing the screen with at least one neutral gray layer (3, $3_1$ or $3_2$) separately from the diffusion layer 2 in a manner as shown in FIGS. 1, 2, 3 or 4.

Light absorption of the neutral gray layer 3, i.e., the range of the optical density of the same from 0.05 to 0.7 that is determined in the present invention is realized by the coloring matter of neutral gray contained in the neutral gray layer 3. However, minute particles of carbon black instead of the coloring matter of neutral gray can be mixed into the neutral gray layer 3 to realize the determined range. Particularly, in the case such as shown in FIG. 2 or FIG. 4 in which the neutral gray layer is adhered to the diffusion layer, an effect similar to the case where the coloring matter of neutral gray is mixed into the base material (glass or a transparent synthetic resin) to form the neutral gray layer can be expected if black pigment instead of the coloring matter of neutral gray is mixed into the base material to form the neutral gray layer on condition that the thickness of the neutral gray layer is equal to or smaller than 3 mm.

A pigment reflects and diffuses light, whether it be in large or small amounts. Both reflectance and diffuse reflectance of carbon black pigment are small. Although the resolution of the screen decreases if the neutral gray layer diffuses light, the resolution of the screen hardly decreases if the thickness of the neutral gray layer is sufficiently small with the neutral gray layer being adhered to the diffusion layer. This is because the neutral gray layer becomes part of the diffusion layer, on which the projection light is focused.

In each of the aforementioned first through fourth embodiments, the screen can be provided with any other layer or layers other than the transparent layer 1, the diffusion layer 2 and the neutral gray layer (3, $3_1$ and $3_2$) if desired.

As can be understood from the foregoing, according to the transmission type projection screen to which the present invention is applied, the contrast and resolution of the proper image can be prevented from deteriorating due to the light (reflected light) being diffused by the diffusion layer rearwardly to be reflected by the rear surface of the transparent layer to thus proceed back to the diffusion layer.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A transmission type projection screen comprising:
   a diffusion layer on which projection light is focused; and
   a neutral gray layer positioned behind said diffusion layer on a rear side of said diffusion layer at which said projection light enters;
   wherein the optical density of said neutral gray layer is in the range of 0.05 to 0.7.

2. The transmission type projection screen according to claim 1, wherein said neutral gray layer comprises at least one of a coloring matter and a carbon black pigment.

3. The transmission type projection screen according to claim 1, wherein said diffusion layer comprises a neutral gray coloring matter.

4. The transmission type projection screen according to claim 1, wherein said projection screen is a non-deformable screen.

5. The transmission type projection screen according to claim 1, wherein said projection screen is a bendable screen.

6. The transmission type projection screen according to claim 1, wherein said projection screen is able to be rolled up.

7. A transmission type projection screen comprising:
   a diffusion layer;
   a transparent layer; and
   a neutral gray layer,
   wherein the optical density of said neutral gray layer is in the range of 0.05 to 0.7.

8. The transmission type projection screen according to claim 7, wherein said diffusion layer, said transparent layer and said neutral gray layer are arranged in this order from an audience side to a projector side.

9. The transmission type projection screen according to claim 7, wherein said diffusion layer, said neutral gray layer and said transparent layer are arranged in this order from an audience side to a projector side.

10. The transmission type projection screen according to claim 7, wherein said neutral gray layer comprises at least one of a coloring matter and a carbon black pigment.

11. The transmission type projection screen according to claim 7, wherein said diffusion layer comprises a neutral gray coloring matter.

12. The transmission type projection screen according to claim 7, wherein said projection screen is a non-deformable screen.

13. The transmission type projection screen according to claim 7, wherein said projection screen is a bendable screen.

14. The transmission type projection screen according to claim 7, wherein said projection screen is able to be rolled up.

15. The transmission type projection screen according to claim 7, wherein said transparent member is made of one of a non-deformable transparent plastic plate, a bendable transparent plastic sheet, and a transparent plastic sheet which is able to be rolled up.

16. A transmission type projection screen comprising:
    a diffusion layer;
    a first neutral gray layer;
    a transparent layer; and
    a second neutral gray layer;
    wherein said diffusion layer, said first neutral gray layer, said transparent layer and said second neutral gray layer are arranged in this order from an audience side to a projector side; and
    wherein the total optical density of said first neutral gray layer and said second neutral gray layer is in the range of 0.05 to 0.7.

17. The transmission type projection screen according to claim 16, wherein said neutral gray layer comprises at least one of a coloring matter and a carbon black pigment.

18. The transmission type projection screen according to claim 16, wherein said diffusion layer comprises a neutral gray coloring matter.

19. The transmission type projection screen according to claim 16, wherein said projection screen is a non-deformable screen.

20. The transmission type projection screen according to claim 16, wherein said projection screen is a bendable screen.

21. The transmission type projection screen according to claim 16, wherein said projection screen is able to be rolled up.

22. The transmission type projection screen according to claim 16, wherein said transparent member is made of one of a non-deformable transparent plastic plate, a bendable transparent plastic sheet, and a transparent plastic sheet which is able to be rolled up.

23. A transmission type projection screen comprising:
    a diffusion layer; and
    a neutral gray layer positioned behind said diffusion layer on a rear side of said diffusion layer at which said projection light enters;
    wherein said diffusion layer is made of a bendable plastic sheet, and
    wherein the optical density of said neutral gray layer is in the range of 0.05 to 0.7.

24. The transmission type projection screen according to claim 23, wherein said neutral gray layer comprises at least one of a coloring matter and a carbon black pigment.

* * * * *